US008712181B2

(12) United States Patent
Crucs (10) Patent No.: US 8,712,181 B2
(45) Date of Patent: Apr. 29, 2014

(54) REAL-TIME APPLICATION OF FILTERS BASED ON IMAGE ATTRIBUTES

(75) Inventor: Kevin M. Crucs, Copley, OH (US)

(73) Assignee: Apteryx, Inc., Akron, OH (US)

(*) Notice: Subject to any disclaimer, the term of this patent is extended or adjusted under 35 U.S.C. 154(b) by 344 days.

(21) Appl. No.: 13/159,526

(22) Filed: Jun. 14, 2011

(65) Prior Publication Data

US 2012/0321213 A1    Dec. 20, 2012

(51) Int. Cl.
*G06K 9/40*    (2006.01)
(52) U.S. Cl.
USPC .......................................................... 382/262
(58) Field of Classification Search
USPC ........... 345/77, 252, 606, 611, 617, 625, 687;
348/254, 270, 273, 365, 603, 673, 674,
348/678, 687, 743, E9.054, E13.069,
348/E11.009, E5.074, E5.119; 358/3.27,
358/512, 519, 532; 365/206; 382/167, 255,
382/260, 262, 263, 264, 274
See application file for complete search history.

(56) References Cited

U.S. PATENT DOCUMENTS

| | | | |
|---|---|---|---|
| 6,747,561 B1* | 6/2004 | Reeves ....................... 340/573.1 |
| 7,680,306 B2* | 3/2010 | Boutant et al. ................ 382/119 |
| 2006/0188147 A1 | 8/2006 | Rai et al. | |
| 2007/0086638 A1* | 4/2007 | Ackley et al. ................. 382/132 |
| 2007/0258638 A1* | 11/2007 | Howerton, Jr. ............... 382/154 |
| 2009/0006132 A1* | 1/2009 | Avinash et al. .................... 705/3 |
| 2010/0037062 A1* | 2/2010 | Carney ........................... 713/176 |
| 2011/0085740 A1* | 4/2011 | Liege et al. ................... 382/254 |
| 2011/0161076 A1* | 6/2011 | Davis et al. ................... 704/231 |
| 2012/0189182 A1* | 7/2012 | Liang et al. ................... 382/131 |

* cited by examiner

*Primary Examiner* — Gregory F Cunningham
(74) *Attorney, Agent, or Firm* — Hahn Loeser & Parks LLP (57) ABSTRACT

Systems, methods, and computer readable media for automatically modifying digital image data in accordance with preferences of a user. When a user accesses a set of digital image data over a network using a computer system, the computer system automatically reads an identifier associated with the set of digital image data and applies at least one digital image filter to the set of digital image data, where the at least one digital image filter is correlated with or mapped to the associated identifier. The user is able to define the identifiers, the filters, and the mapping (correlation) between the identifiers and the filters, thus establishing image display preferences for the user.

20 Claims, 6 Drawing Sheets

REAL-TIME APPLICATION OF FILTERS BASED ON IMAGE ATTRIBUTES

TECHNICAL FIELD

Certain embodiments relate to image enhancement. More particularly, certain embodiments relate to systems, methods, and non-transitory computer-readable media to automatically modify a digital image acquired by an imaging machine according to an established preference, based on an identifier or attribute of the digital image.

BACKGROUND

When a digital image is acquired by an imaging machine (e.g., a medical imaging machine such as an intraoral dental X-ray system), the image may be stored and/or displayed to a user. Various post-acquisition digital filtering techniques may be applied to the acquired raw image data to prepare the digital image for display to a user. Different users may have different preferences with respect to how the image should appear when displayed. Some users may prefer a high contrast image, other users may prefer an edge enhanced image, and still other users may prefer a particular image color scheme. Users may have other preferences as well, depending on the imaging machine, the image size, the imaging modality, and the particular anatomy being imaged.

Further limitations and disadvantages of conventional, traditional, and proposed approaches will become apparent to one of skill in the art, through comparison of such systems and methods with the subject matter of the present application as set forth in the remainder of the present application with reference to the drawings.

SUMMARY

An embodiment of the present invention comprises a method to automatically modify a digital image acquired by an imaging machine according to an established preference. The method includes accessing an electronically stored set of digital image data acquired by an imaging machine, using a computer system. The method further includes automatically reading an identifier associated with the set of digital image data in response to the accessing step, using the computer system. The method further includes automatically applying at least one digital imaging filter to the set of digital image data to generate a filtered set of digital image data in response to the reading step, using the computer system, based on a predefined correlation between the identifier and the at least one digital imaging filter. The method may further include automatically displaying the filtered set of digital image data on a display remote from the imaging machine. The identifier may be embedded within the set of digital image data. Alternatively, the identifier may be an inherent characteristic of the set of digital image data. As a further alternative, the identifier may be in a form of a data tag associated with the set of digital image data. The method steps of automatically reading and applying are performed remotely from the imaging machine, in accordance with an embodiment of the present invention. The various digital filters may include at least one of a noise-removal filter, a spatial-sharpening filter, a spatial-smoothing filter, a brightness-adjusting filter, a contrast-adjusting filter, a gamma correction filter, a low-pass filter, a high-pass filter, a bandpass filter, a median filter, a thresholding filter, and a color mapping filter, for example. Other filters are possible as well, in accordance with various embodiments of the present invention. The identifier may correspond to at least one of an image size of the set of digital image data, a resolution of the set of digital image data, a manufacturer of the imaging machine, a model number of the imaging machine, an imaging modality associated with the set of digital image data, an image color scheme (e.g., a color map or a gray-scale map) of the set of digital image data, an anatomy associated with the set of digital image data, and a location of origin associated with the set of digital image data. Other types of identifiers are possible as well, in accordance with various embodiments of the present invention.

Another embodiment of the present invention comprises a non-transitory computer-readable media having computer-readable instructions recorded thereon and capable of being executed by a computer system to automatically modify a digital image acquired by an imaging machine according to an established preference. The instructions include instructions for accessing an electronically stored set of digital image data acquired by an imaging machine, and instructions for automatically reading an identifier associated with the set of digital image data in response to the accessing step. The instructions may further include instructions for automatically applying at least one digital imaging filter to the set of digital image data to generate a filtered set of digital image data in response to the reading step based on a predefined mapping from the identifier to the at least one digital imaging filter. The identifier may be embedded within the set of digital image data. Alternatively, the identifier may be an inherent characteristic of the set of digital image data. As a further alternative, the identifier may be in a form of a data tag associated with the set of digital image data. The various digital filters may include at least one of a noise-removal filter, a spatial-sharpening filter, a spatial-smoothing filter, a brightness-adjusting filter, a contrast-adjusting filter, a gamma correction filter, a low-pass filter, a high-pass filter, a bandpass filter, a median filter, a thresholding filter, and a color mapping filter, for example. Other filters are possible as well, in accordance with various embodiments of the present invention. The identifier may correspond to at least one of an image size of the set of digital image data, a resolution of the set of digital image data, a manufacturer of the imaging machine, a model number of the imaging machine, an imaging modality associated with the set of digital image data, an image color scheme (e.g., a color map or a gray-scale map) of the set of digital image data, an anatomy associated with the set of digital image data, and a location of origin associated with the set of digital image data. Other types of identifiers are possible as well, in accordance with various embodiments of the present invention.

A further embodiment of the present invention comprises a method to establish a digital imaging filtering scheme. The method includes defining a plurality of image identifiers in at least one data structure stored on a computer system. The method further includes defining a plurality of digital imaging filters in at least one data structure stored on a computer system. The method also includes defining a mapping from each of the plurality of image identifiers to at least one of the plurality of digital imaging filters in at least one data structure stored on a computer system. The various digital imaging filters may include at least one of a noise-removal filter, a spatial-sharpening filter, a spatial-smoothing filter, a brightness-adjusting filter, a contrast-adjusting filter, a gamma correction filter, a low-pass filter, a high-pass filter, a bandpass filter, a median filter, a thresholding filter, and a color mapping filter, for example. Other filters are possible as well, in accordance with various embodiments of the present invention. The image identifiers may each correspond to at least one of an image size of the set of digital image data, a resolution of the set of digital image data, a manufacturer of the imaging machine, a model number of the imaging machine, an imaging modality associated with the set of digital image data, an image color scheme (e.g., a color map or a gray-scale map) of the set of digital image data, an anatomy associated with the set of digital image data, and a location of origin associated with the set of digital image data. Other types of identifiers are possible as well, in accordance with various embodiments of the present invention.

Another embodiment of the present invention comprises a non-transitory computer-readable media having computer-readable instructions recorded thereon and capable of being executed by a computer system to establish a digital imaging filtering scheme. The instructions include instructions for defining a plurality of image identifiers, instructions for defining a plurality of digital imaging filters, and instructions for defining a mapping from each of the plurality of image identifiers to at least one of the plurality of digital imaging filters. The various digital imaging filters may include at least one of a noise-removal filter, a spatial-sharpening filter, a spatial-smoothing filter, a brightness-adjusting filter, a contrast-adjusting filter, a gamma correction filter, a low-pass filter, a high-pass filter, a bandpass filter, a median filter, a thresholding filter, and a color mapping filter, for example. Other filters are possible as well, in accordance with various embodiments of the present invention. The image identifiers may each correspond to at least one of an image size of the set of digital image data, a resolution of the set of digital image data, a manufacturer of the imaging machine, a model number of the imaging machine, an imaging modality associated with the set of digital image data, an image color scheme (e.g., a color map or a gray-scale map) of the set of digital image data, an anatomy associated with the set of digital image data, and a location of origin associated with the set of digital image data. Other types of identifiers are possible as well, in accordance with various embodiments of the present invention.

These and other novel features of the subject matter of the present application, as well as details of illustrated embodiments thereof, will be more fully understood from the following description and drawings.

DETAILED DESCRIPTION

As used herein, the term "digital imaging filter" refers to any technique that may be applied to a raw set of digital image data to modify the raw set of digital image data for display. Examples of such digital imaging filter techniques include noise-removal, color mapping, spatial-sharpening, spatial-smoothing, brightness-adjusting, contrast adjusting, gamma correction, and thresholding. Other techniques are possible as well, as may be known to those skilled in the art.

Some digital imaging filters may be one-dimensional in the vertical direction, one-dimensional in the horizontal direction, or two-dimensional in both the vertical and horizontal directions, based on a predefined kernel of image pixels. Some digital imaging filters may provide a low-pass filtering operation (e.g., spatial smoothing), a high-pass filtering operation (edge enhancement), a band-pass filtering operation, a median filtering operation, or any of a number of other possible filtering operations which are well known in the art.

"Brightness" is a term used to describe the overall amount of light in an image. When brightness is increased, the value of every pixel in the image is increased (e.g., closer to a value of 255 or white). When brightness is decreased, the value of every pixel in the image is decreased (e.g., closer to a value of 0 or black).

"Contrast" is a term used to describe the degree of difference between the brightest and darkest components in an image. The amount of the intensity scale (e.g., 0 to 255) used by an image is the dynamic range of the image. An image with "good" contrast has a "good" dynamic range. During a contrast adjustment, each pixel value in an image is scaled by a contrast value which results in redistributing the intensities over a wider or narrower range. Increasing the contrast spreads the pixel values across a wider range, and decreasing the contrast squeezes the pixel values into a narrower range.

"Gamma" is a term used to describe a type of image correction which is a specialized form of contrast enhancement and is designed to enhance contrast in the very dark or very light regions of an image. Adjusting the gamma setting modifies an image by applying standard, nonlinear gamma curves to the intensity scale. For example, a gamma value of 1 is equivalent to the identity curve (no change in the intensity scale). An increase in the gamma value (setting to a value greater than 1) generally results in lightening an image and increasing the contrast in the darker areas of the image. A decrease in the gamma value (setting to a value less than 1) generally results in darkening of the image and emphasizes contrast in the lighter areas of the image.

The term "thresholding" is used to describe a filtering process where, for example, pixel values in an image below a predefined pixel value level are filtered out and not displayed (or displayed as black, for example). Alternatively, the term "thresholding" is used to describe a filtering process where, for example, pixel values in an image above a predefined pixel value level are filtered out and not displayed (or displayed as black, for example). As a further alternative, two threshold settings may be defined, for example, for which pixel values in an image being between the threshold settings are displayed normally, and the rest are filtered out (or displayed as black, for example). As still a further alternative, two threshold settings may be defined, for example, for which pixel values in an image being between the threshold settings are filtered out (or displayed as black, for example), and the rest are displayed normally.

The term "color mapping" is used to describe the assigning of gray-scale colors (or, for example, RGB colors) to the image pixel values of an image, in accordance with an embodiment of the present invention. For example, in an image having pixel values spanning the dynamic range of 0 to 255, a linear gray-scale map may be applied, where a pixel value of 0 is assigned the black color, a pixel value of 255 is assigned the white color, and the pixel values from 1 to 254 are linearly distributed over the remaining gray-scale colors. Other types of gray-scale color maps may be applied as well which distribute the gray-scale colors in a non-linear (e.g., logarithmic) manner or piece-wise linear manner, for example.

The terms "image identifier" and "image attribute" are used interchangeably herein.

Figure 1:
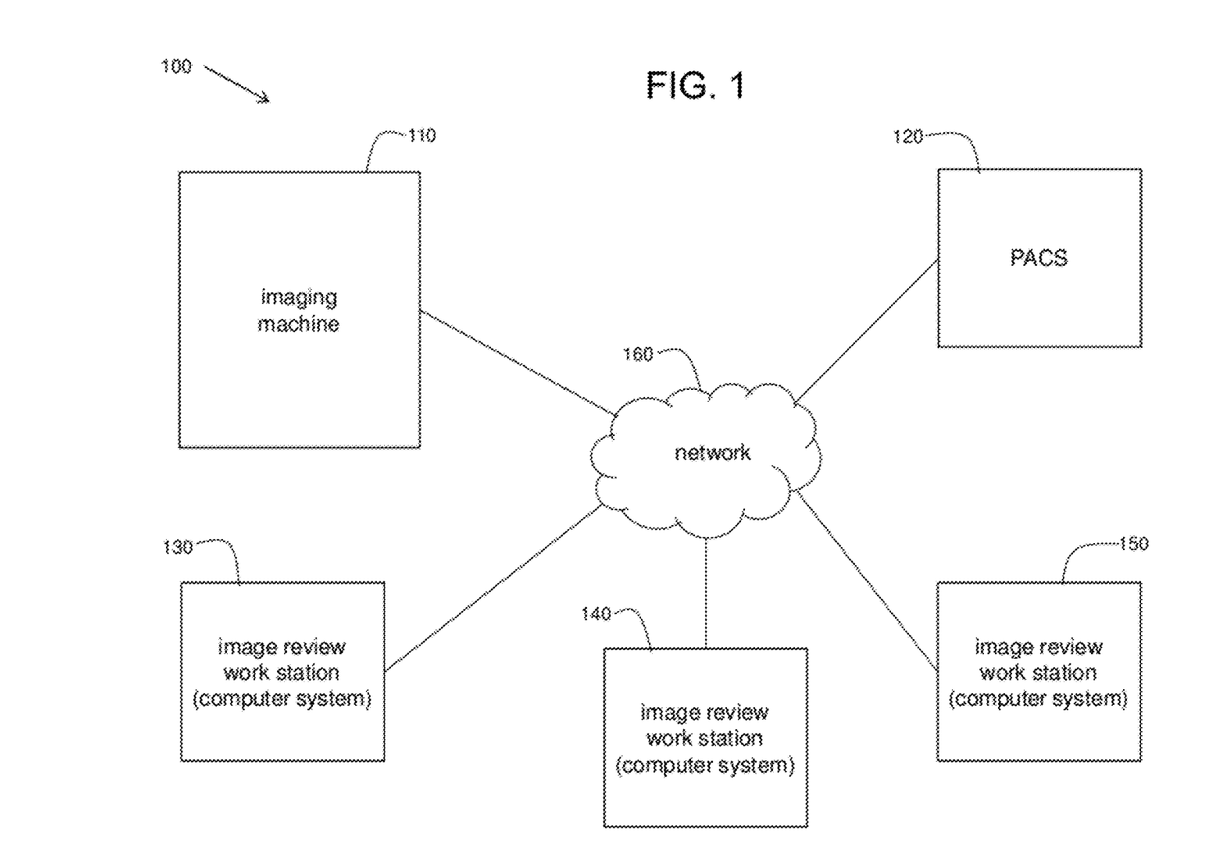
FIG. 1 illustrates a schematic diagram of a first example embodiment of a system for accessing an electronically stored set of digital image data and applying at least one digital imaging filter to the set of digital image data based on an identifier associated with the set of digital image data.

FIG. 1 illustrates a schematic block diagram of a first example embodiment of a system 100 for accessing an electronically stored set of digital image data and applying at least one digital imaging filter to the set of digital image data based on an identifier associated with the set of digital image data. The stored set of digital image data is "raw" in the sense that no additional filtering has been applied to the image data since it was acquired by an imaging machine. The system 100 includes an imaging machine 110 (e.g., a digital intraoral imaging machine) configured to acquire digital image data. The system 100 also includes a Picture Archiving and Communication System (PACS) 120 configured to receive and store digital image data from the imaging machine 110.

The system 100 also includes several image review work stations 130, 140, 150 which are computer systems configured to display digital image data to a user after applying one or more digital imaging filters. The system also includes a network 160 (e.g., the internal operationally connected to the imaging machine 110, the PACS 120 and the image review work stations 130-150. In accordance with an embodiment of the present invention, the image review work stations 130-150 are located remotely from each other and from the imaging machine 110 and the PACS 120. Similarly, the imaging machine 110 and the PACS 120 are located remotely from each other. Communication between the various elements of the system 100 takes place via the network 160.

In accordance with other embodiments of the present invention, the various elements of the system 100 may be remote from or co-located with each other in various combinations. For example, the image review work stations 130-150 may be co-located in a radiologist office while the imaging machine 110 and PACS 120 are co-located at a hospital.

Any of the image review work stations 130-150 may retrieve digital image data from the imaging machine 110 and/or from the PACS 120 via the network 160. A set of digital image data may be representative of, for example, a digital intraoral x-ray image. Each image review work station is able to independently and automatically apply one or more digital imaging filters to a set of digital image data based on an identifier or attribute associated with the set of digital image data. The digital imaging filters to be automatically applied are predefined by the user of the image review work station. In this manner, based on an identifier or attribute of any particular set of digital image data retrieved by an image review work station, the retrieved set of digital image data may be automatically modified to a preference of a user and then subsequently displayed.

As a result, any particular set of digital image data retrieved from, for example, an imaging machine 110 or a PACS 120, can be displayed in a unique manner at any of the image review work stations 130-150, based on user preference and an identifier or attribute of the retrieved digital image data. For example, a user of the image review work station 130 may decide that images acquired by the imaging machine 110 are too pixally or edgy. Therefore, when retrieving a set of digital image data that was acquired by the imaging machine 110, the image review work station 130 automatically applies a digital smoothing filter to the set of digital image data to give the displayed image a smoother, less pixally and less edgy appearance. Similarly, a user of the image review work station 140 may decide that images acquired by the imaging machine 110 are too dark. Therefore, when retrieving a set of digital image data that was acquired by the imaging machine 110, the image review work station 140 automatically applies a brightness filter to the set of digital image data to give the displayed image a brighter appearance.

In accordance with various embodiments of the present invention, when a set of digital image data is retrieved, one or more data tags associated with the set of digital image data may also be automatically retrieved along with the set of digital image data. The one or more data tags may include information associated with the set of digital image data including, for example, identifier data which can be used to determine which filter or filters to apply to a retrieved set of digital image data. The term "data tag" is used herein to mean any non-image digital data that is associated with or "tagged to" a set of digital image data. A set of digital image data retrieved by an image review work station may be identified in other ways as well. For example, an identifier may be embedded within the set of digital image data or the identifier may be an inherent characteristic of the set of digital image data, as is discussed in more detail later herein.

Figure 2:
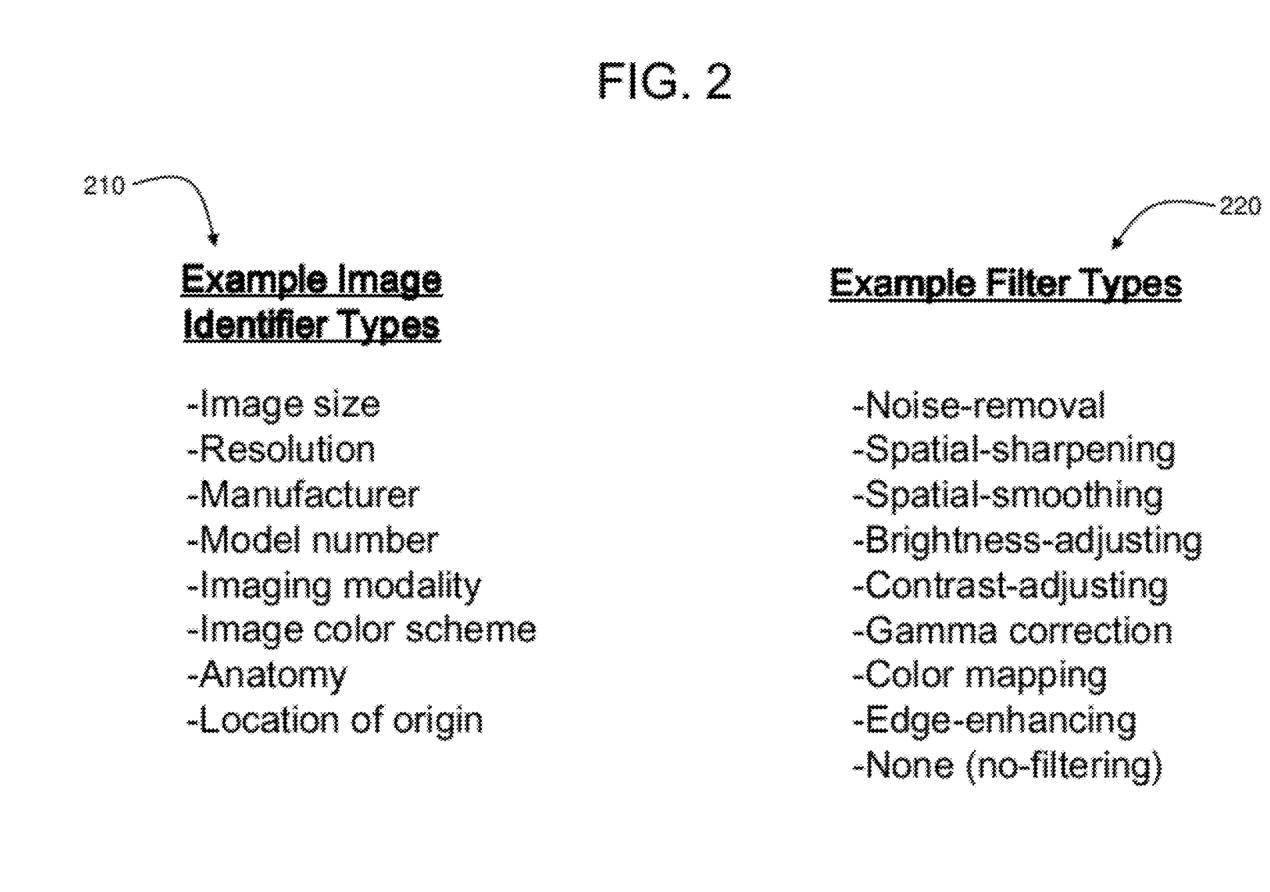
FIG. 2 illustrates example embodiments of a list of a set of image identifier types and a list of a set of imaging filter types.

FIG. 2 illustrates example embodiments of a list of a set of image identifier types 210 and a list of a set of imaging filter types 220. Some image identifiers may be based on inherent characteristics of the image data set such as, for example, image size, image resolution, or image color scheme. Other image identifiers may be embedded within the image data set as a label (e.g., a text label) indicating, for example, an imaging modality, an anatomy, or a location of origin of the image data set. Still other image identifiers may be in the form of an associated data tag indicating, for example, an imaging machine manufacturer and/or a model number. Other types of image identifiers are possible as well, in accordance with various embodiments of the present invention.

Various types of digital imaging filters may include noise-removal filters, spatial-sharpening filters (e.g., a high-pass spatial filter), spatial-smoothing filters (e.g., a low-pass spatial filter), brightness-adjusting filters, contrast-adjusting filters, gamma correction filters, color mapping filters, edge-enhancing filters, median filters, and thresholding filters, or combinations thereof. In accordance with an embodiment of the present invention, an image identifier may be mapped to or correlated with one or more digital imaging filters, including a no-filtering option (none). The no-filtering option may be mapped to, for example, when an image identifier corresponds to an image from an imaging source that provides images which are already satisfactory to the user.

Figure 3:
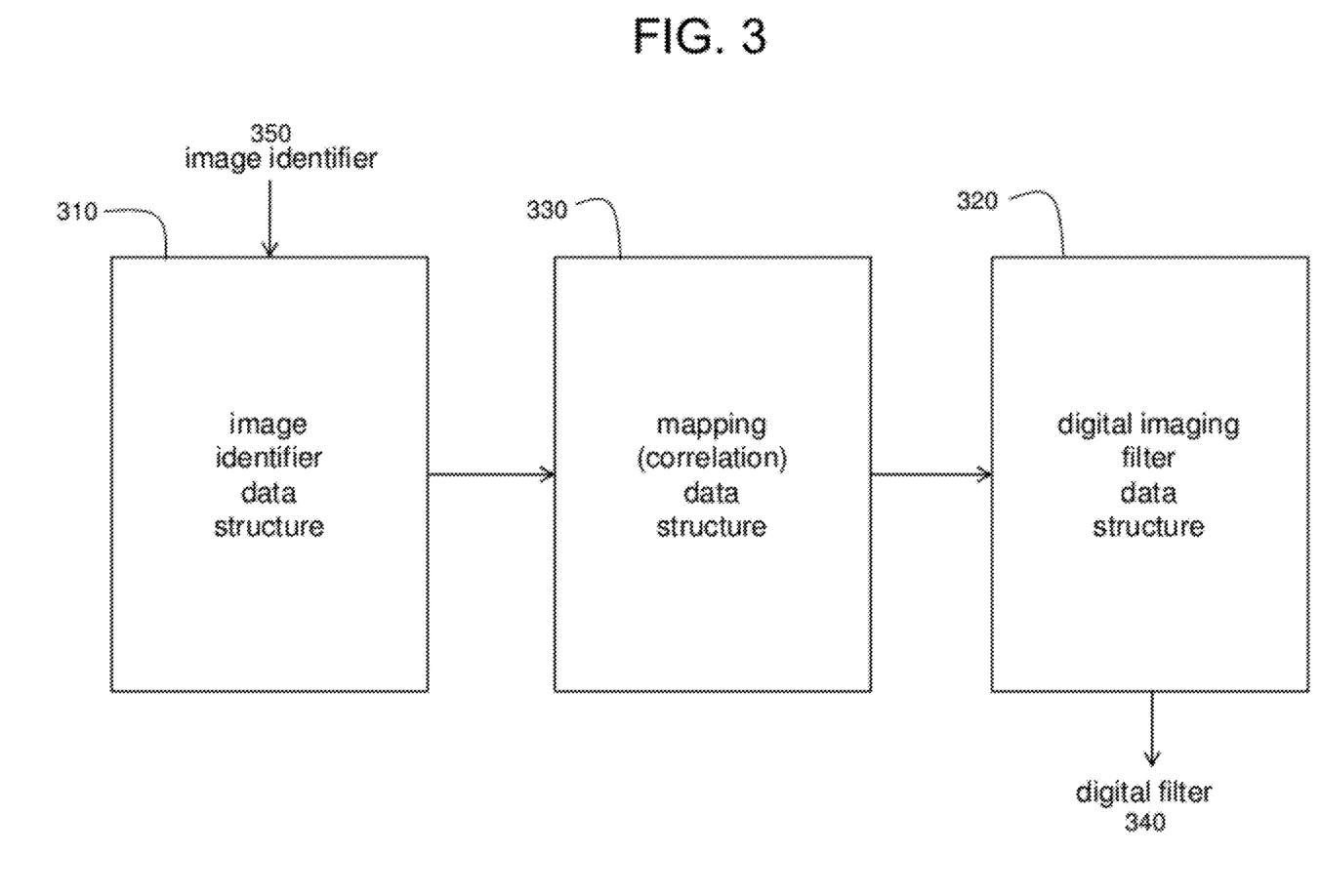
FIG. 3 illustrates a set of data structures used for defining and mapping image identifier data to digital imaging filters.

FIG. 3 illustrates a set of data structures used for defining and mapping image identifier data to digital imaging filters. The first data structure is an image identifier data structure 310. The image identifier data structure 310 defines a set of image identifiers corresponding to, for example, the types 210 of FIG. 2. The second data structure is a digital imaging filter data structure 320. The digital imaging filter data structure 320 defines a set of digital imaging filters corresponding to, for example, the types 220 of FIG. 2. The third data structure is a mapping or correlation data structure 330. The mapping (correlation) data structure 330 defines the mapping from an image identifier of the image identifier data structure 310 to one or more filters of the digital imaging filter data structure 320. The data structures 310-330 may exist on an image review work station (e.g., 130) and are used to define which digital filter 340 or filters is to be applied to a retrieved set of digital image data, based on the image identifier 350 of the set of digital image data.

Figure 4:
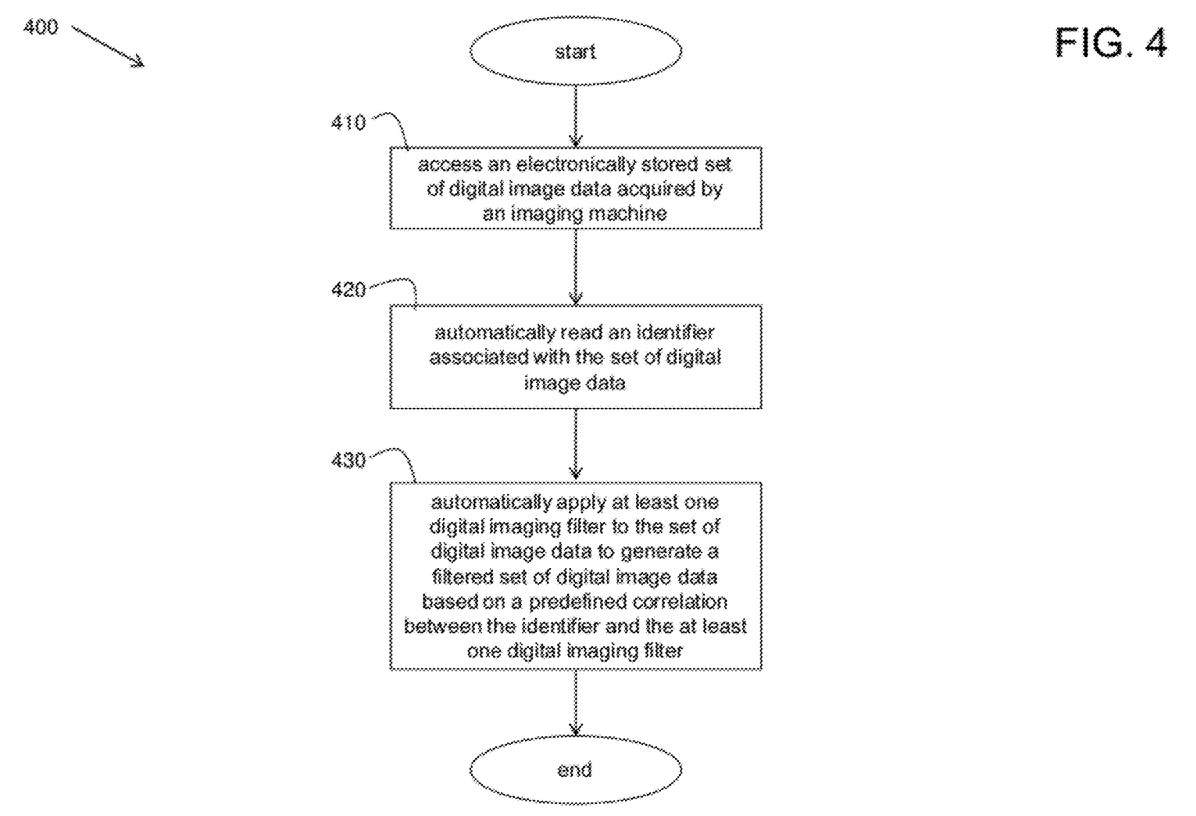
FIG. 4 illustrates a flowchart of a method to automatically modify a digital image acquired by an imaging machine according to an established preference.

FIG. 4 illustrates a flowchart of a method 400 to automatically modify a digital image acquired by an imaging machine according to an established preference. In step 410, an electronically stored set of digital image data, which has been acquired by an imaging machine, is accessed. For example, the set of digital image data may be accessed from the acquiring imaging machine itself 110, from a PACS 120, or from some other computer-based system capable of storing the set of digital image data.

In step 420, an image identifier associated with the set of digital image data is automatically read in response to accessing the set of digital image data. The image identifier may be embedded within the set of digital image data, may be an inherent characteristic of the digital image data, or may be in the form of a data tag associated with the set of digital image data. In step 430, at least one digital imaging filter (one or more filters), that is correlated (mapped) to the image identifier, is automatically applied to the set of digital image data, in response to reading the image identifier, to generate a filtered set of digital image data. In accordance with an embodiment of the present invention, the method 400 is performed by an image review work station. However, as discussed later herein, the method 400 may be performed by some other computer system, in accordance with various alternative embodiments of the present invention.

Figure 5:
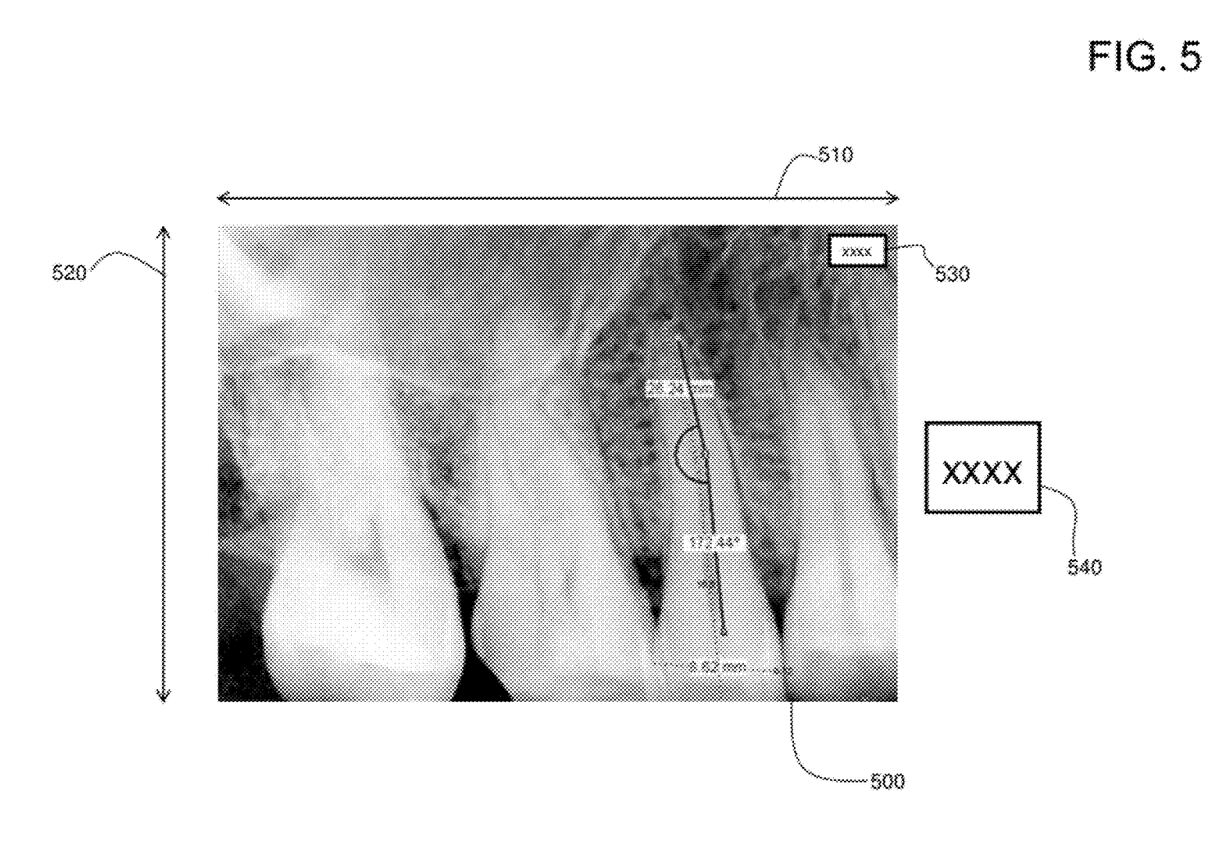
FIG. 5 illustrates an exemplary embodiment of an image (representing digital image data) having several types of identifiers.

FIG. 5 illustrates an exemplary embodiment of an image 500 (representing a set of digital image data) showing several possible types of identifiers. The image 500 is an intraoral x-ray image. In accordance with an embodiment of the present invention, one image identifier may be based on the size (e.g., width and height) of the image (e.g., 1000 pixels wide by 700 pixels tall). When an image is accessed by an image review work station, the work station may proceed to determine the width 510 and height 520 of the image 500. A particular combination of image width 510 and height 520 may constitute an image identifier which may be correlated to one or more digital imaging filters.

Alternatively, another image identifier may be based on embedded information 530 within the image 500 (set of digital image data). For example, the image 500 may include a label 530 which is effectively overlaid onto and embedded in the image data. The embedded information 530 may include, for example, a manufacturer and/or a model number of the imaging machine that acquired the image 500, an imaging modality (e.g., intraoral x-ray), an anatomy (e.g., teeth number), or a location of origin (e.g., a particular hospital or dental office) of the image 500. Other embedded identifiers are possible as well, in accordance with various embodiments of the present invention.

As a further alternative, the image identifier may be in the form of a data tag 540 associated with the image 500. When the image 500 is accessed by an image review work station, the data tag 540 as well as the set of digital image data making up the image 500 is also accessed. The data tag 540 may include various forms of identifying information that may be used by the image review work station to map to one or more digital imaging filters.

In accordance with an embodiment of the present invention, the image review work stations 130-150 are each a processor-based computer system configured for running software instructions for the purpose of performing the methods, functions, and techniques described herein. Each user may define the image identifiers, the digital imaging filters, and the mapping therebetween, in accordance with an embodiment of the present invention. In accordance with another embodiment of the present invention, the image identifiers and digital imaging filters are predefined as part of the work station, and the user simply defines the mapping between the predefined identifiers and filters.

The various methods, functions, and techniques described herein may be stored as computer-executable instructions on a non-transitory computer-readable media. In accordance with various embodiments of the present invention, a non-transitory computer-readable media may include, for example, a CD-ROM, a hard drive, a magnetic disk, an optical disk, or a flash drive. Other types of non-transitory computer-readable media are possible as well. The instructions stored on such computer-readable media are capable of being read by and executed by a computer system such as, for example, an image review work station.

In accordance with an alternative embodiment of the present invention, the image review work stations 130-150 are each hardware-intensive computer systems configured using, for example, digital signal processors (DSPs) to perform many of the methods, functions, and techniques described herein. For example, application of a digital imaging filter to a set of digital image data may be performed by one or more DSPs.

As an example of the various methods, functions, and techniques described herein, referring to FIG. 1, the first image review work station 130 accesses a first set of digital image data from the PACS 120 via the network 160. The first set of digital image data is accessed with a data tag indicating the name of the manufacturer of the imaging machine that acquired the first set of digital image data. The first image review work station 130 automatically reads the manufacturer name in the data tag as an image identifier. The first image review work station 130 automatically associates the manufacturer name to a digital spatial-smoothing filter based on its predefined mapping and automatically applies the digital spatial-smoothing filter to the first set of digital image data. The work station 130 then proceeds to display the resultant smoothed set of digital image data to the user of the first image review work station 130 as an image.

Continuing with the example, the second image review work station 140 accesses the same first set of digital image data from the PACS 120 via the network 160 and automatically reads the manufacturer name in the data tag as an image identifier. The second image review work station 140 automatically associates the manufacturer name to a digital spatial-sharpening filter based on its predefined mapping and automatically applies the digital spatial-sharpening filter to the first set of digital image data. The work station 140 then proceeds to display the resultant sharpened set of digital image data to the user of the second image review work station 140 as an image.

Further continuing with the example, the third image review work station 150 accesses a second set of digital image data from the imaging machine 110 via the network 160. The second set of digital image data is 1000 pixels wide by 700 pixels in height. The pixel dimensions are automatically read by the third image review work station 150 as an image identifier. The third image review work station 150 automatically associates the pixel dimensions to a digital contrast-adjusting filter based on its predefined mapping and automatically applies the digital contrast-adjusting filter to the second set of digital image data. The work station 150 then proceeds to display the contrast-adjusted set of digital image data to the user of the third image review work station 150 as an image.

Figure 6:
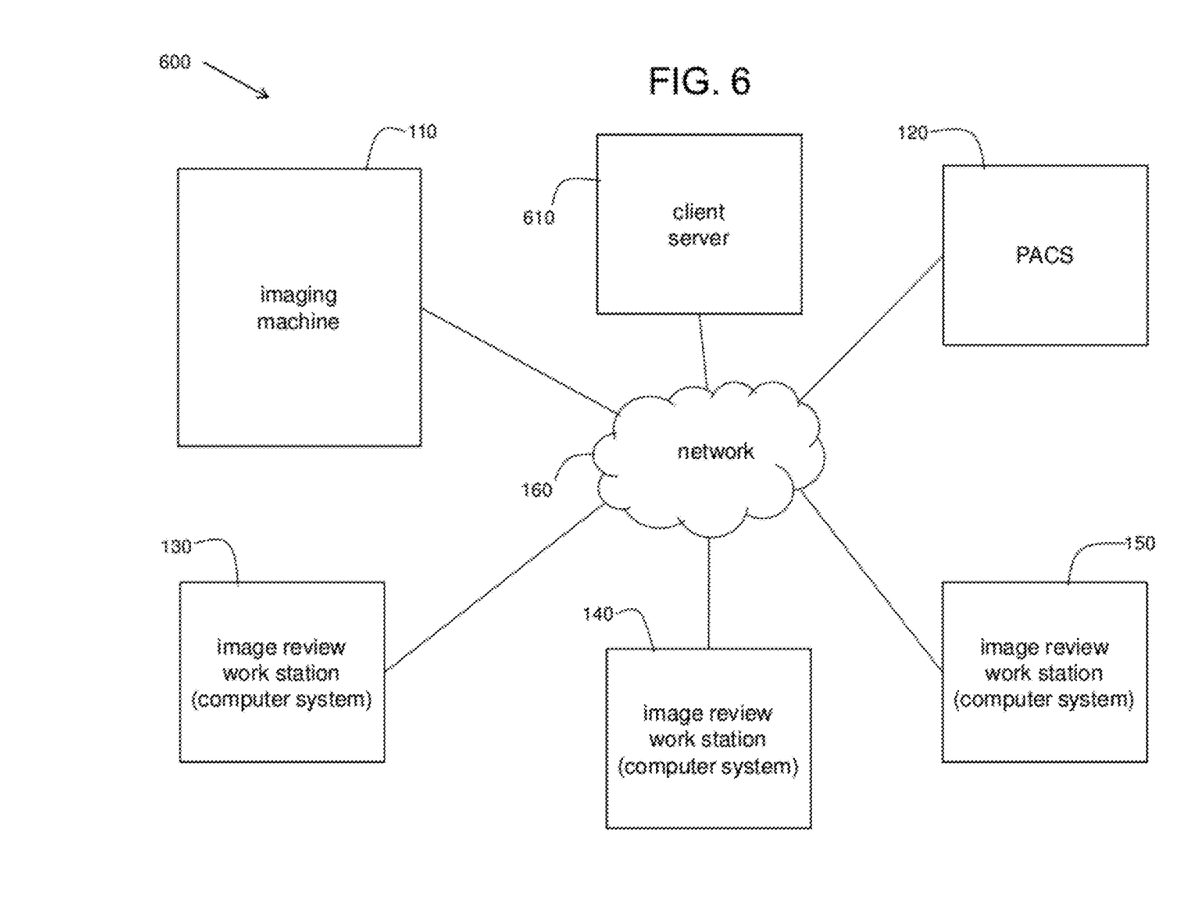
FIG. 6 illustrates a schematic diagram of a second example embodiment of a system for accessing an electronically stored set of digital image data and applying at least one digital imaging filter to the set of digital image data based on an identifier associated with the set of digital image data.

FIG. 6 illustrates a schematic block diagram of a second example embodiment of a system 600 for accessing an electronically stored set of digital image data and applying at least one digital imaging filter to the set of digital image data based on an identifier associated with the set of digital image data.

The system 600 is very similar to the system 100 of FIG. 1 except that the system 600 further includes a client server 610 operationally connected to the network 160. The client server 610 performs the method 400 of FIG. 4, instead of an image review work station. Each image review work station 130-150 acts as a client that requests images.

A request is sent from an image review work station to the client server 610 via the network 160 for a particular image which may be stored on the web server 610, on the imaging machine 110, or on the PACS 120, for example. The client server 610 processes the request by identifying the client from the request and calling up the client's predefined set of data structures 310-330 (see FIG. 3) that are stored on the client server 610. The client server 610 accesses the requested set of digital image data (e.g., from the imaging machine 110, the PACS 120, or the client server 610 itself) based on the request, automatically reads an identifier associated with the set of digital image data, automatically applies at least one digital image filter, that is correlated or mapped to the identifier, to the set of digital image data, and sends the filtered set of digital image data to the client (image review work station) via the network 160 for display. In this manner, the method 400 of FIG. 4 is provided as a service by the client server 610.

Initially, however, the client at the image review work station defines the desired image identifiers, digital imaging filters, and mapping from the image identifiers to the digital imaging filters and provides that mapping to the client server 610, for example, in the form of the data structures 310-330. Alternatively, the client server 610 may provide a service for the client (e.g., in the form of a "set-up" web site) to select from a plurality of predefined image identifiers and a plurality of predefined digital imaging filters and define the mapping between the two. Alternatively, the services may be provided by the PACS 120 or the imaging machine 110, in accordance with various alternative embodiments of the present invention.

As an example, referring to FIG. 6, the image review work station 140 requests a particular image from the client server 610 via the network 160. The client server 610 identifies the client based on identifying information (e.g., an IP address) in the request. The client server 610 determines that the requested image is stored on the PACS 120 as a first set of digital image data and accesses the first set of digital image data from the PACS 120. The client server 610 reads or extracts an image identifier that is embedded in the accessed set of digital image data which corresponds to a particular imaging modality (e.g., an intraoral x-ray bitewing series). The client server 610 uses the identifying information of the client to call up the client's predefined set of data structures 310-330 (see FIG. 3) that are stored on the client server 610. The client server 610 then applies the image identifier to the client's predefined set of data structures. As a result, the client server 610 finds that a gamma correction filter is correlated to the image identifier. The client server 610 proceeds to automatically apply the gamma correction filter to the first set of digital image data and returns the gamma-corrected set of digital image data to the image review work station 140 as the requested image, which may be viewed by the user of the work station 140.

In summary, systems, methods, and computer readable media for automatically modifying raw digital image data in accordance with preferences of a user are disclosed. When a user accesses a set of raw digital image data over a network using a computer system, the computer system automatically reads an identifier associated with the set of raw digital image data and applies at least one digital image filter to the raw set of digital image data, where the at least one digital image filter is correlated with the associated identifier. The user is able to define the identifiers, the filters, and the mapping (correlation) between the identifiers and the filters, thus establishing image display preferences for the user.

While the claimed subject matter of the present application has been described with reference to certain embodiments, it will be understood by those skilled in the art that various changes may be made and equivalents may be substituted without departing from the scope of the claimed subject matter. In addition, many modifications may be made to adapt a particular situation or material to the teachings of the claimed subject matter without departing from its scope. Therefore, it is intended that the claimed subject matter not be limited to the particular embodiment disclosed, but that the claimed subject matter will include all embodiments falling within the scope of the appended claims.

What is claimed is:

1. A method to automatically modify a digital image acquired by an imaging machine according to an established preference, said method comprising:
   accessing an electronically stored set of digital image data acquired by an imaging machine, using a computer system;
   automatically reading an identifier associated with said set of digital image data, using said computer system; and
   automatically applying at least one digital imaging filter to said set of digital image data to generate a filtered set of digital image data, using said computer system, based on a predefined correlation between said identifier and said at least one digital imaging filter.

2. The method of claim 1 wherein said identifier is embedded within said set of digital image data.

3. The method of claim 1 wherein said identifier is an inherent characteristic of said set of digital image data.

4. The method of claim 1 wherein said identifier is in a form of a data tag associated with said set of digital image data.

5. The method of claim 1 wherein said method steps of automatically reading and applying are performed remotely from said imaging machine.

6. The method of claim 1 further comprising automatically displaying said filtered set of digital image data on a display remote from said imaging machine.

7. The method of claim 1 wherein said at least one digital image filter comprises at least one of a noise-removal filter, a spatial-sharpening filter, a spatial-smoothing filter, a brightness-adjusting filter, a contrast-adjusting filter, a gamma correction filter, a low-pass filter, a high-pass filter, a bandpass filter, a median filter, a thresholding filter, and a color mapping filter.

8. The method of claim 1 wherein said identifier corresponds to at least one of an image size of said set of digital image data, a resolution of said set of digital image data, a manufacturer of said imaging machine, a model number of said imaging machine, an imaging modality associated with said set of digital image data, an image color scheme of said set of digital image data, an anatomical part associated with said set of digital image data, and a location of origin associated with said set of digital image data.

9. A non-transitory computer-readable media having computer-readable instructions recorded thereon and capable of being executed by a computer system to automatically modify a digital image acquired by an imaging machine according to an established preference, said instructions comprising:
   instructions for accessing an electronically stored set of digital image data acquired by an imaging machine;

instructions for automatically reading an identifier associated with said set of digital image data; and instructions for automatically applying at least one digital imaging filter to said set of digital image data to generate a filtered set of digital image data based on a predefined mapping from said identifier to said at least one digital imaging filter.

10. The non-transitory computer-readable media of claim 9 wherein said identifier is embedded within said set of digital image data.

11. The non-transitory computer-readable media of claim 9 wherein said identifier is an inherent characteristic of said set of digital image data.

12. The non-transitory computer-readable media of claim 9 wherein said identifier is in a form of a data tag associated with said set of digital image data.

13. The non-transitory computer-readable media of claim 9 wherein said at least one digital imaging filter comprises at least one of a noise-removal filter, a spatial-sharpening filter, a spatial-smoothing filter, a brightness-adjusting filter, a contrast-adjusting filter, a gamma correction filter, a low-pass filter, a high-pass filter, a bandpass filter, a median filter, a thresholding filter, and a color mapping filter.

14. The non-transitory computer-readable media of claim 9 wherein said identifier corresponds to at least one of an image size of said set of digital image data, a resolution of said set of digital image data, a manufacturer of said imaging machine, a model number of said imaging machine, an imaging modality associated with said set of digital image data, an image color scheme of said set of digital image data, an anatomical part associated with said set of digital image data, and a location of origin associated with said set of digital image data.

15. A method to establish a digital imaging filtering scheme, said method comprising:

modifying data in at least a first data structure stored in a computer memory on a computer system by populating at least the first data structure with first data corresponding to a plurality of defined image identifiers;

modifying data in at least a second data structure stored in a computer memory on the computer system by populating at least the second data structure with second data corresponding to a plurality of defined digital imaging filters; and modifying data in at least a third data structure stored in a computer memory on the computer system by populating at least the third data structure with third data that maps said plurality of image identifiers to said plurality of digital imaging filters.

16. The method of claim 15 wherein each of said plurality of digital imaging filters comprises at least one of a noise-removal filter, a spatial-sharpening filter, a spatial-smoothing filter, a brightness-adjusting filter, a contrast-adjusting filter, a gamma correction filter, a low-pass filter, a high-pass filter, a bandpass filter, a median filter, a thresholding filter, and a color mapping filter.

17. The method of claim 15 wherein each of said plurality of image identifiers corresponds to one of an image size of a set of digital image data, a resolution of a set of digital image data, a manufacturer of an imaging machine, a model number of an imaging machine, an imaging modality associated with a set of digital image data, an image color scheme of a set of digital image data, an anatomical part associated with a set of digital image data, and a location of origin associated with a set of digital image data.

18. A non-transitory computer-readable media having computer-readable instructions recorded thereon and capable of being executed by a computer system to establish a digital imaging filtering scheme, said instructions comprising:

instructions for modifying data in at least a first data structure stored in a computer memory on a computer system by populating at least the first data structure with first data corresponding to a plurality of defined image identifiers;

instructions for modifying data in at least a second data structure stored in a computer memory on the computer system by populating at least the second data structure with second data corresponding to a plurality of defined digital imaging filters; and instructions for modifying data in at least a third data structure stored in a computer memory on the computer system by populating at least the third data structure with third data that maps said plurality of image identifiers to said plurality of digital imaging filters.

19. The non-transitory computer-readable media of claim 18 wherein each of said plurality of digital imaging filters comprises at least one of a noise-removal filter, a spatial-sharpening filter, a spatial-smoothing filter, a brightness-adjusting filter, a contrast-adjusting filter, a gamma correction filter, a low-pass filter, a high-pass filter, a bandpass filter, a median filter, a thresholding filter, and a color mapping filter.

20. The non-transitory computer-readable media of claim 18 wherein each of said plurality of image identifiers corresponds to one of an image size of said a set of digital image data, a resolution of a set of digital image data, a manufacturer of an imaging machine, a model number of an imaging machine, an imaging modality associated with a set of digital image data, an image color scheme of a set of digital image data, an anatomical part associated with a set of digital image data, and a location of origin associated with a set of digital image data.

* * * * *

UNITED STATES PATENT AND TRADEMARK OFFICE
CERTIFICATE OF CORRECTION

PATENT NO. : 8,712,181 B2  Page 1 of 1
APPLICATION NO. : 13/159526
DATED : April 29, 2014
INVENTOR(S) : Kevin M. Crucs It is certified that error appears in the above-identified patent and that said Letters Patent is hereby corrected as shown below:

In the Specification:

Column 5; Lines 25-28:

Delete: "The system also includes a network 160 (e.g., the internal operationally connected to the imaging machine 110, the PACS 120 and the image review work stations 130-150."

Insert: --The system also includes a network 160 (e.g., the internet) operationally connected to the imaging machine 110, the PACS 120 and the image review workstations 130-150.--

Signed and Sealed this
Eighth Day of July, 2014

Michelle K. Lee
*Deputy Director of the United States Patent and Trademark Office*